United States Patent [19]
Wessels

[11] Patent Number: 5,863,057
[45] Date of Patent: Jan. 26, 1999

[54] SEMITRAILER LOAD BALANCING SYSTEM

[76] Inventor: Larry L. Wessels, 549 S. Xenon Ct., Lakewood, Colo. 80228

[21] Appl. No.: 709,647

[22] Filed: Sep. 9, 1996

Related U.S. Application Data

[63] Continuation-in-part of Ser. No. 639,347, May 1, 1996.
[51] Int. Cl.$^6$ .................................................... B62D 33/08
[52] U.S. Cl. ..................................... 280/149.2; 280/407.1; 280/438.1
[58] Field of Search ............................ 280/149.2, 405.1, 280/407.1, 407, 441, 438.1

[56] References Cited

U.S. PATENT DOCUMENTS

| | | | |
|---|---|---|---|
| 1,314,498 | 2/1919 | Bower | 280/149.2 |
| 2,835,504 | 5/1958 | Acker | 280/407 |
| 3,494,632 | 2/1970 | Bostrom | 280/407.1 |
| 4,353,565 | 10/1982 | Smith et al. | 280/149.2 |
| 4,429,892 | 2/1984 | Frampton et al. | 280/407 |
| 4,649,369 | 3/1987 | Walker et al. | 280/438.1 |
| 4,854,407 | 8/1989 | Wagner | 280/407 |
| 5,127,697 | 7/1992 | St. Marie | 296/171 |
| 5,137,296 | 8/1992 | Forman | 280/149.2 |
| 5,199,732 | 4/1993 | Lands et al. | 280/149.2 |
| 5,346,233 | 9/1994 | Moser | 280/149.2 |

Primary Examiner—Paul N. Dickson
Attorney, Agent, or Firm—Edwin H. Crabtree; Ramon L. Pizarro; Donald W. Margolis

[57] ABSTRACT

A system for adjusting a sliding undercarriage along a length of a semitrailer and adjusting a sliding fifth wheel along a length of a tractor. The tractor used for pulling the semitrailer. The system is used for balancing a load on the semitrailer, adjusting the truck and semitrailer turning radius and for operator convenience. The sliding undercarriage and sliding fifth wheel may be adjusted from the cab of the tractor when the tractor and trailer are in operation. The system includes a control panel under computer control. The control panel is received inside the cab of the tractor and electrically connected to a first electric motor and first gear box mounted on the tractor. The first gear box drives a pair of parallel screws threadably attached to a pair of ball screws. The ball screws are secured to the fifth wheel of the tractor. When the first gear box is actuated, the screws attached to the fifth wheel move the fifth wheel forward and aft on the tractor. The control panel is also electrically connected to a second electric motor and second gear box mounted on the trailer. The second gear box drives a pair of elongated parallel screws threadably attached to a pair of ball screws. The ball screws are secured to the sliding undercarriage mounted underneath the semitrailer. When the second gear box is actuated, the screws move the sliding undercarriage forward and aft on the trailer. The control box is designed for receiving satellite communications and audio communications for adjusting trailer weight requirements when traveling interstate.

14 Claims, 4 Drawing Sheets

SEMITRAILER LOAD BALANCING SYSTEM

This application is a continuation-in-part of the subject inventor's application filed on May 1, 1996, group art unit 3501, Ser. No. 08/639,347 and having a title of "LOCKING SYSTEM FOR A SEMITRAILER SLIDING UNDERCARRIAGE WITH AIR PRESSURE PROTECTION VALVE".

BACKGROUND OF THE INVENTION

(a) Field of the Invention

This invention relates to a system for adjusting loads on a semitrailer and more particularly, but not by way of limitation, to a system for adjusting a sliding undercarriage along a length of a semitrailer and adjusting a sliding fifth wheel along a length of a tractor. The system used for balancing loads, adjusting the turning radius of the truck and semitrailer and for operator convenience.

(b) Discussion of Prior Art

A common truck transportation system in the United States is a tractor pulling a semitrailer. The tractor has an engine, transmission, steerable front axle with wheels and one or more rear drive axles and wheels. The tractor is attached to a semitrailer through a fifth wheel which is located over the tractor's rear drive axle. The semitrailer rides on a running gear or called herein a "sliding undercarriage". The sliding undercarriage includes a suspension, one or more unpowered axles, wheels, a pneumatic brake system and a locking pin release system. The sliding undercarriage is slidable along a portion of the length of the underside of the semitrailer.

Today, federal and state laws define weight limits per axle for tractors and semitrailers. Fines are imposed at each state port-of-entry if load limits are exceeded. By shifting the sliding undercarriage under the semitrailer, the driver can improve the balance of load between the tractor and the semitrailer to meet highway axle weight limit requirements which may vary from state to state. Also, to improve maneuverability on city streets, the sliding undercarriage can be shifted toward the tractor to shorten the unit's turning radius.

The sliding undercarriage is typically locked between two parallel rails that are integral to the structure of the bottom frame of the semitrailer. Lateral movement relative to the semitrailer is limited to the clearance between the two rails and the sliding undercarriage frame. The sliding undercarriage can be moved longitudinally, generally in a range of five to nine feet, under the semitrailer by sliding along and between the two rails. The sliding undercarriage is locked to the semitrailer rails by a system of usually two or four steel pins that are part of the sliding undercarriage frame. The pins are aligned in opposing pairs in the sliding undercarriage structure and in a locked position project outward through locking pin holes in the rails. The locking pin holes are generally spaced three to six inches apart along the rails. The locking pins are usually spring loaded to retain them in a locked position during highway travel. The locking pins are retracted and reinserted in the locking pin holes using a manually operated locking pin release system.

Semitrailers are commonly equipped with pneumatic spring brake systems which typically operate at 90–120 psi. The spring loaded air trailer parking brakes are automatically set by the springs when air pressure is removed through a control in the tractor which vents the supply air line and spring brake air lines to the atmosphere. To release the air brakes, air pressure from the tractor compressor is routed through the supply air line and a relay valve to apply pressure from the air supply tank to overcome the trailer parking brake spring bias force.

The current way to reposition the sliding undercarriage under the semitrailer is through a process of trial and error. The driver locks the brakes on both the tractor and semitrailer. The driver then climbs out of the tractor, walks to the sliding undercarriage, and pulls or lifts the manually operated locking pin release lever which is usually positioned immediately ahead of or between the left wheels of the sliding undercarriage. Most Original Equipment Manufacturer (OEM) manually operated locking pin release systems are a mechanical apparatus designed to rotate when the locking pin release lever is pulled or lifted. The pins are retracted by a pulling or a lifting force transmitted through a series of linkages designed to provide a mechanical advantage to overcome the spring loaded locking pin retention force. The pin release apparatus usually includes provisions to hold the lever and locking pins in the retracted position while the driver returns to the tractor. The driver then releases the brakes on the tractor while leaving the brakes applied on the semitrailer's sliding undercarriage. The tractor is then driven forward or backward to slide the semitrailer relative to the sliding undercarriage. The driver, after sliding the semitrailer the distance considered correct, then reapplies the tractor brakes. The driver again leaves the tractor, walks back to the sliding undercarriage, and releases or pushes down the pin release lever. The spring loaded locking pins are usually not perfectly aligned to reinsert through locking holes. Each locking pin, when not fully reinserted, is pressed by the locking pin retaining spring against the rail at a location between two locking pin holes. The driver returns to the tractor, releases the tractor brakes, and moves the semitrailer only a few inches or less as required for the spring loaded pins to drop into the first holes in the rails that move into alignment. The driver must then reapply the brakes and walk around the semitrailer to visually verify that all pins are in locked positions. The driver then secures the locking pin release lever to the sliding undercarriage for highway travel.

The process of retracting the locking pins and sliding the bottom side of the semitrailer over the sliding undercarriage is more easily completed with the assistance of a second person. The second person pulls or lifts the locking pin release lever and assists the driver in repositioning the sliding undercarriage under the semitrailer. The manually operated pin retraction systems can become impossible to operate due to damage or corrosion of the linkage and contamination with dirt and ice from exposure under the semitrailer. Locking pins can also become stuck in the holes in the rails if the semitrailer is parked on an incline or positioned with a slight twist in the frame. Pins are often loosened only by pounding them out with hammers. The usual procedure to loosen stuck locking pins is to apply the brakes on the sliding undercarriage and rock the semitrailer by repeatedly driving the tractor forward and backward a few inches. The assistant provides a constant pull on the pin release lever to apply the maximum force possible to overcome the locking pin springs and withdraw the pins if they become loose. Similar problems are often encountered in trying to reinsert locking pins. Extra force and assistance to align individual pins may be required to reinsert locking pins into new locking holes after the sliding undercarriage has been repositioned. The locking pin linkage can be damaged, bent, or twisted during attempts to loosen stuck pins. Distorted linkage may limit the distance that locking pins can be reinserted and make it impossible to reinsert pins into locked positions. The assistant positioned under the semitrailer near the wheels during attempts to loosen stuck locking pins or reinsert pins can be seriously injured. Bad weather such as rain, ice, and snow increase the probability of injury to an assistant positioned near the sliding undercarriage wheels.

The Department of Transportation highway port-of-entry weigh stations and routine highway safety inspections include verification per 49 CFR 393.207(b) that all locking pins are properly inserted. Fines may be imposed and vehicles designated out-of-service until maintenance is completed. According to this federal agency, highway accidents have been caused by locking pins not being properly inserted for securing the sliding undercarriage to the semitrailer rails.

The problems inherent in retracting and inserting locking pins with the above mentioned manually operated pin retraction apparatus have been recognized in U.S. Pat. No. 4,944,522 to Hart, U.S. Pat. No. 4,838,578 to Baxter, U.S. Pat. No. 4,353,565 to Smith et al., U.S. Pat. No. 4,286,797 to Mekosh et al., U.S. Pat. No. 3,778,079 to Vornberger, U.S. Pat. No. 3,618,969 to Glassmeye, U.S. Pat. No. 5,199,732 to Lands et al., and U.S. Pat. No. 5,137,296 to Forman.

The above mentioned patents to Hart and Baxter provide means to modify the manually operated pin retraction apparatus. The modified systems as described do not provide sufficient force to retract stuck locking pins, especially when complicated by corrosion, damage or contamination. Also, the flexibility of the modified linkage described in these patents is an inefficient means to reinsert locking pins into the locking pin holes. Also, bent linkage may actually prevent the locking pins from being fully inserted into locked positions even when the control lever position indicates that all pins are locked.

In the patents to Smith et al. and to Mekosh et al. complex electromechanical and pneumatic systems are disclosed that require extensive structural modifications to the semitrailer and possibly to the tractor. The patent to Smith et al. describes a few of the features incorporated into the novel system described herein, but the Smith et al. disclosure, for example, does not include a system wherein a pressure transducer provides control to automatically reinsert the locking pins should a semitrailer's spring brakes be released when the locking pins are retracted. Also, the system prevents the locking pins from being retracted unless the driver sets the semitrailer brakes before adjusting the sliding undercarriage on the semitrailer.

The patents to Lands et al. and Forman provide air operated cylinders and locking pins which are pneumatically released by the cylinders. But the systems described in these two patents do not provide an all pneumatic system which prevents the locking pins from being retracted unless the semitrailer brakes are set and will automatically reset the pins if air pressure is applied to release the semitrailer brakes.

In U.S. Pat. Nos. 5,314,201 and 5,465,990 to the subject inventor, an electro-pneumatic and all pneumatic semitrailer sliding undercarriage locking pin system is described that solves the above mentioned problems related to the manual operation of pulling locking pins.

None of the above mentioned patents describe the unique features and advantages of the subject semitrailer load balancing system which eliminates the adjusting of a sliding undercarriage by inserting and retracting locking pins in locking pins holes along the length of a pair of rails mounted on the bottom of a semitrailer. Also none of the these patents teach the balancing of a load on a semitrailer by adjusting both the sliding undercarriage and fifth wheel either forward or aft.

SUMMARY OF THE INVENTION

In view of the foregoing, it is a primary object of the invention to provide a truck driver and truck owner the benefit of a reliable load balancing system which can easily reposition a sliding undercarriage on a semitrailer and a fifth wheel on a tractor without potential injury to the driver or an assistant.

Another object of the present invention is to provide a load balancing system wherein the various prior art locking pin systems used with a sliding undercarriage on a semitrailer are eliminated.

Yet another object of the invention is to provide a load balancing system which can be operated under all climatic conditions and from the cab of the tractor. The system is automatic and under computer control and operates with a push of a load balancing button. If there is a computer failure, the load can be balanced using finger tip levers. The invention allows a driver to quickly adjust a load on the semitrailer for different weight requirements from state to state. Both the fifth wheel of the tractor and the sliding undercarriage of the semitrailer can be adjusted both forward and aft without manual assistance and while the unit is moving.

Still another object of the load balancing system is ease in installation without added significant cost or weight to the trailer design. Also, the system meets all design dynamic requirements, environmental requirements and Department of Transportation requirements.

A further object of the balancing system is during city driving, the truck operator can slide, while the tractor and semitrailer are in motion, both the sliding undercarriage and/or the fifth wheel forward to provide a shorter turning radius for ease in turning the tractor and semitrailer on city streets.

Still further an object of the invention is to provide a computer with the control panel which is designed to receive communications via a satellite network and provide radio communications to a state weigh station. The truck can communicate with the weigh station indicating that the truck's load is properly balanced. This eliminates the need of having to stop at the weigh station thus saving fuel, saving travel time and expense of operating the truck during these type of delays.

Yet another object of the subject invention is the system can be used not only for load balancing but also for adjusting the turning radius of the truck's tractor and the semitrailer. Also the system can be used for driver convience in the adjusting of the fifth wheel and the sliding undercarriage.

The subject system includes a control panel received inside the cab of the tractor and electrically connected to a first electric motor and first gear box mounted on the tractor. The first gear box drives a pair of parallel screws threadably attached to a pair of ball screws. The ball screws are secured to the fifth wheel of the tractor. When the first gear box is actuated, the screws move the fifth wheel forward and aft on the tractor. The control panel is also electrically connected to a second electric motor and second gear box mounted on the trailer. The second gear box drives a pair of elongated parallel screws threadably attached to a pair of ball screws. The ball screws are secured to the sliding undercarriage mounted underneath the semitrailer. When the second gear box is actuated, the screws move the sliding undercarriage forward and aft on the trailer. The control box is under computer control and is designed for receiving satellite communications and audio communications for adjusting trailer weight requirements when traveling interstate. The system is adapted for sending wheel load information to the computer control panel to allow load balancing automatically or manually.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
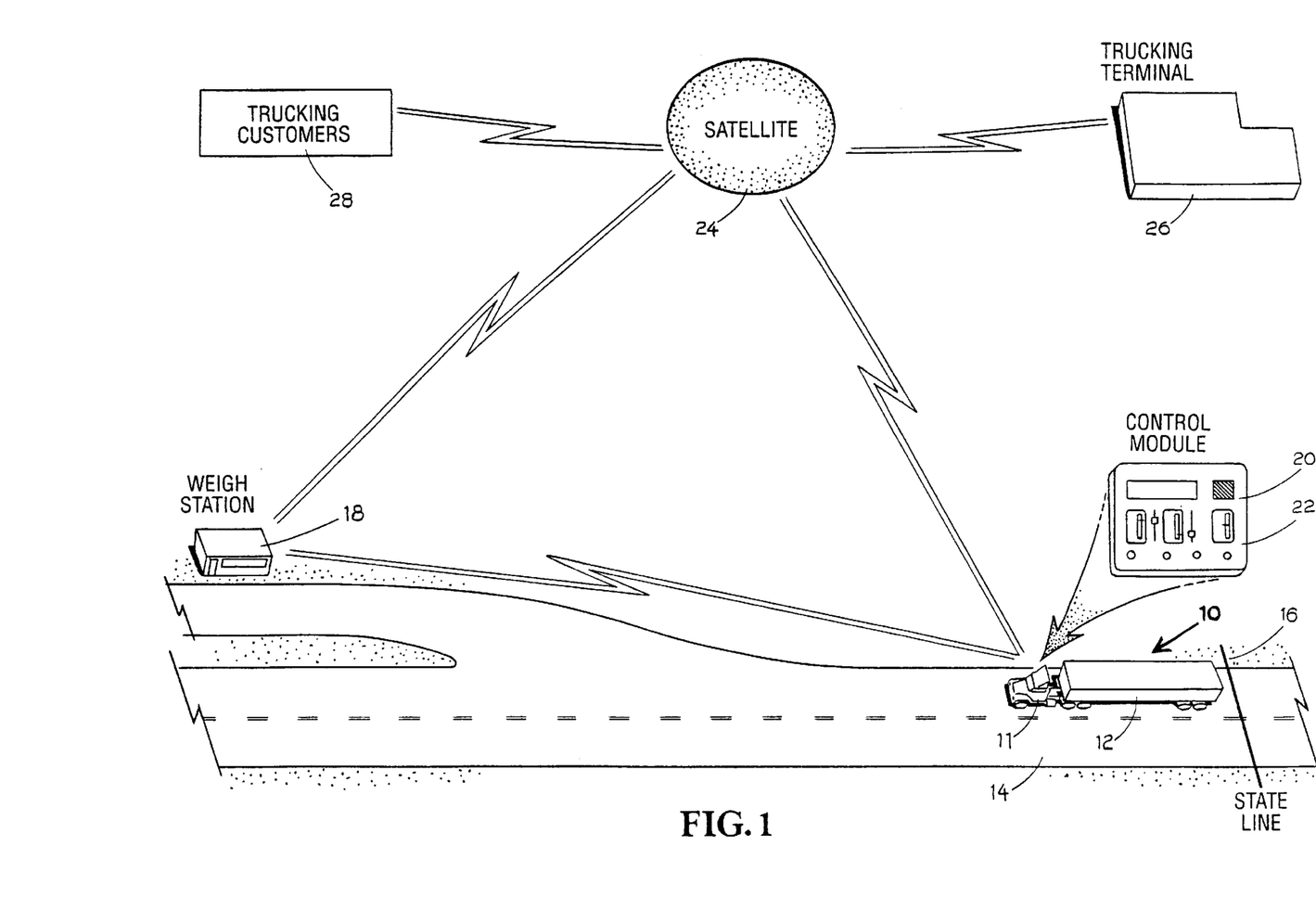
FIG. 1 illustrates an overview of the subject invention used with a tractor and a semitrailer. The control module of the invention communicates with both a satellite and weigh station. The satellite is used to gather information from a trucking terminal and a trucking customer. This information is passed on via the satellite to the control module in the cab of the tractor and to the weigh station.

In FIG. 1 an overview of how the subject invention is used with a truck having a general reference numeral 10. The truck 10 includes a tractor 11 and a semitrailer 12. The truck 10 is shown in this drawing traveling from right to left on a highway 14 having crossed a state line 16 and approaching a weigh station 18. Heretofore the truck 10, without the invention described herein, would stop at the weigh station 18 so that the truck 10 could be weighed to see if the unit was overweight or out of balance based on the legal load limits.

The invention includes a communication and control module 20 having a control panel 22. The control module 20 is under computer control and mounted in the cab of the tractor 11. The computer is not shown in the drawings. The control module 20 receives information as to the balancing of the load in the semitrailer 12 via a satellite 24 which in turn receives information from the truck's trucking terminal 26 at a distant location and from trucking customers 28. The satellite 24 may be a global positioning satellite, i.e. GPS, for determining the exact location of the truck 10 during its travel. The trucking terminal 26 via the satellite 24 will pass on or receive information to and from the control module 20 as to load information, truck location and updating the truck's manifest. The trucking customers 28 can use the satellite 24 to relay information to the truck 10 and the trucking terminal 26 as to change in delivery location, delivery time, amount of load to be picked up and other information that would effect the operation of the truck 10. The driver of the truck 10 can use the control module 20 to radio ahead to the weigh station 18 as to the load on the semitrailer 12 being properly balanced and receive information from the weigh station as to no need to stop at the weigh station 18.

Figure 2:
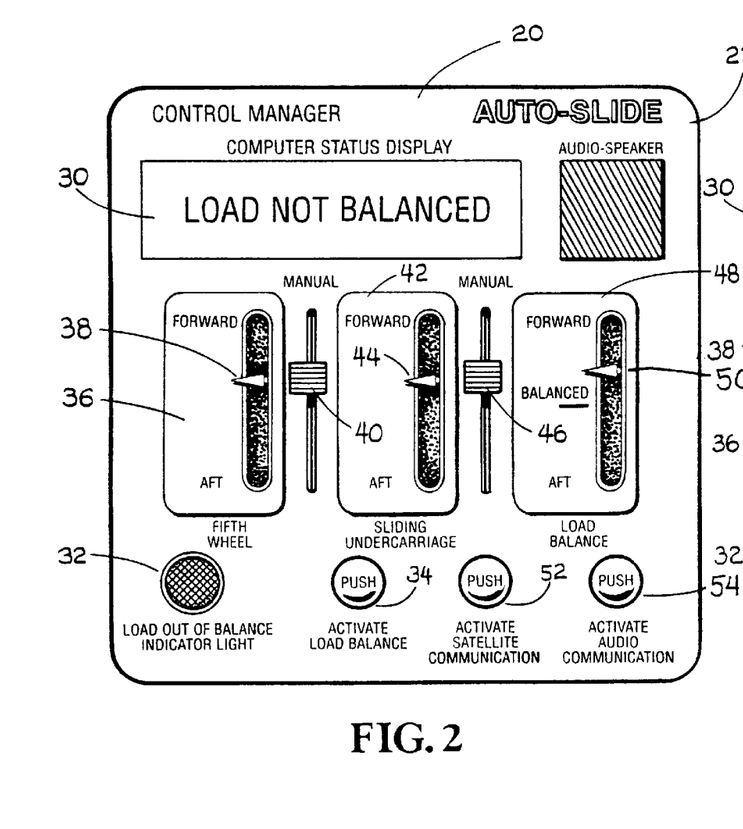
FIG. 2 is a front view of the subject invention's control panel which is mounted in a cab of the a tractor. The control panel is under computer control and in this view the status display indicates a load on the semitrailer is not balanced.

In FIG. 2, a front view of the control panel 22 of the control module 20 is shown which is part of the subject load balancing system. The control panel 22 as mentioned above is under computer control and includes a computer load status display 30 which in this drawing indicates a load on the semitrailer is not balanced. Also at this time a load out of balance indicator light 32 will flash. By pushing a activate load balance button 34, the load on the semitrailer 12 will automatically be balanced with information received from the memory of the computer, providing the trailer's pneumatic and spring operated parking brakes have been disengaged. If the parking brakes are engaged, a notice will appear on the display 30 indicating to the driver that the parking brakes must be disengaged before the load balancing can occur.

The control panel 22 includes a fifth wheel position display 36 with arrow 38 used to indicate if the fifth wheel is in a forward position or an aft position. Next to the display 36 is a finger tip control lever 40 which can be used to manually move the position of the fifth wheel should there be a computer failure. The control panel 22 also includes a sliding undercarriage position display 42 with arrow 44 used to indicate if the sliding undercarriage is in a forward position or an aft position. Next to the display 42 is a finger tip control lever 46 which can be used to manually move the position of the sliding undercarriage should there be a computer failure. Next to the sliding undercarriage position display 42 is a load balance display 48 having an arrow 50 used to indicate if the load is forward, aft or balanced.

In FIG. 1–2 the load is not balanced and arrows 38 and 44 indicated that the fifth wheel and the sliding undercarriage have been adjusted forward. The load balance display 48 confirms that the load on the semitrailer 12 is not balanced and the arrow 50 indicates that the load is forward on the semitrailer 12.

The control panel further includes a push button 52 for receiving and transferring information via the satellite 24. Also a push button 54 is used for activating audio radio communication with the weigh station 18 and the truck terminal 26. An audio speaker 56 is used by the truck driver for communicating information back and forth with the weigh station 18 and the truck terminal 26. Also, the truck terminal 26 can be used for activating the control module 20 and the load balancing system via the satellite 24.

Figure 3:
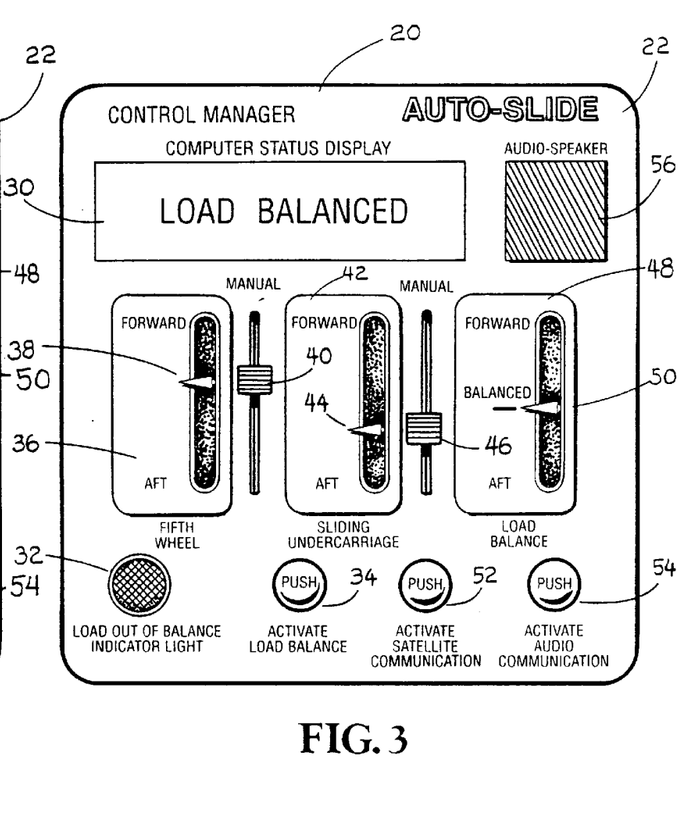
FIG. 3 is a front view of the subject invention's control panel as shown in FIG. 2. The control panel by activating the load balance button has indicated that the load on the semitrailer has been balance.

In FIG. 3, the load on semitrailer 12 has been balanced and the load status display 30 indicates as such. It should be noted that the load status display will be programmed using the control module's computer to also display "Release Trailer Parking Brake", "Activating Load Balance", "Processing Load Balance", "Satellite Communications Established", "Satellite Communications In Progress", "Satellite Communications Complete", "Satellite Load Routing Established", "Satellite Load Routing In Progress", "Satellite Load Routing Complete" and "Audio Communication Required". These visual displays are aids to the truck driver so that he or she will be aware of what the computer is processing and what is being communicated via the satellite 24 to the control module 20.

With the load balanced as indicated in FIG. 3, the load out of balance indicator light 32 will no longer be flashing. Also by looking at the load balance display 48, arrow 50 indicates that the load is in balance. By looking at the fifth wheel position display 36, arrow 38 indicates that the fifth wheel is still in a forward position. On the sliding undercarriage position display 42, arrow 46 indicates that the sliding undercarriage is in a aft position. When balancing a load on the semitrailer 12, the fifth wheel and sliding undercarriage may take on various position forward and aft depending on the weight balance of the load and the load's position inside the semitrailer 12.

Figure 4:
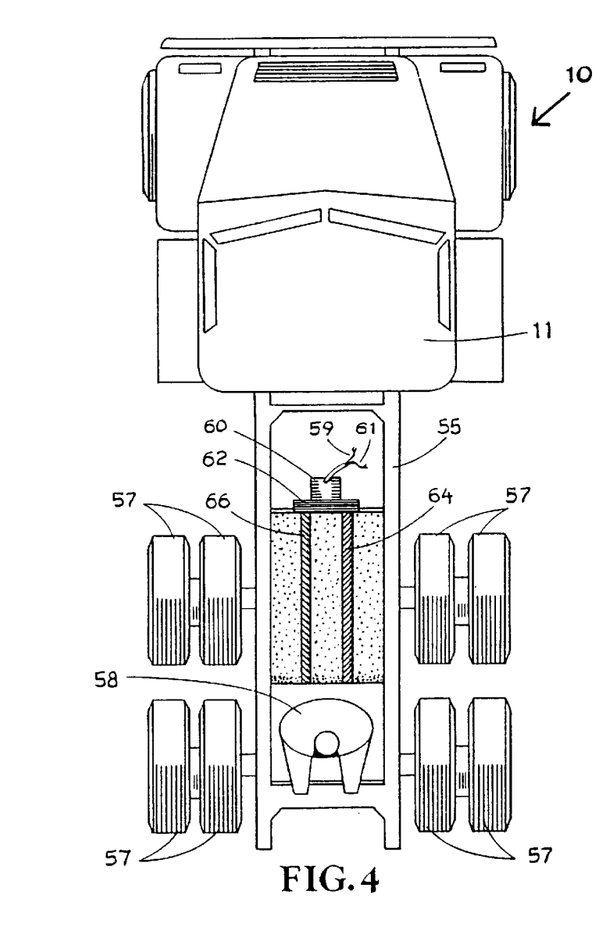
FIG. 4 is a top view of a tractor with sliding fifth wheel. The fifth wheel is moved forward and aft by a first electric motor and first gear box driving a pair of parallel screws attached to a pair of ball screws. The ball screws are secured to the fifth wheel.

In FIG. 4 a top view of the tractor 11 is shown with a sliding fifth wheel 58 mounted on a frame 55 with wheels 57. In this view the sliding fifth wheel 58 is in an aft position. The fifth wheel 58 is moved forward and aft by a first electric motor 60 electrically connected to the control module 20 via electric leads 59 and 61. The first electric motor 60 is also connected to a first gear box 62. The first gear box 62 is connected to and drives a pair of parallel screws 64 and 66. The parallel screws 64 and 66 are attached to a pair of ball screws. The ball screws are not shown in the drawings. The ball screws are secured to the fifth wheel 58. The load balancing system, using the control module 20 with the electric motor 60, gear box 62, parallel screws 64 and 66 and ball screws attached to the fifth wheel 58, is able to move the fifth wheel 58 forward and aft within a fraction of an inch during the operation of the truck 10 to a desired location for load balancing. An electronic servo is built into the first electric motor 60 to hold the fifth wheel 58 in place during highway travel of the truck 10.

Figure 5:
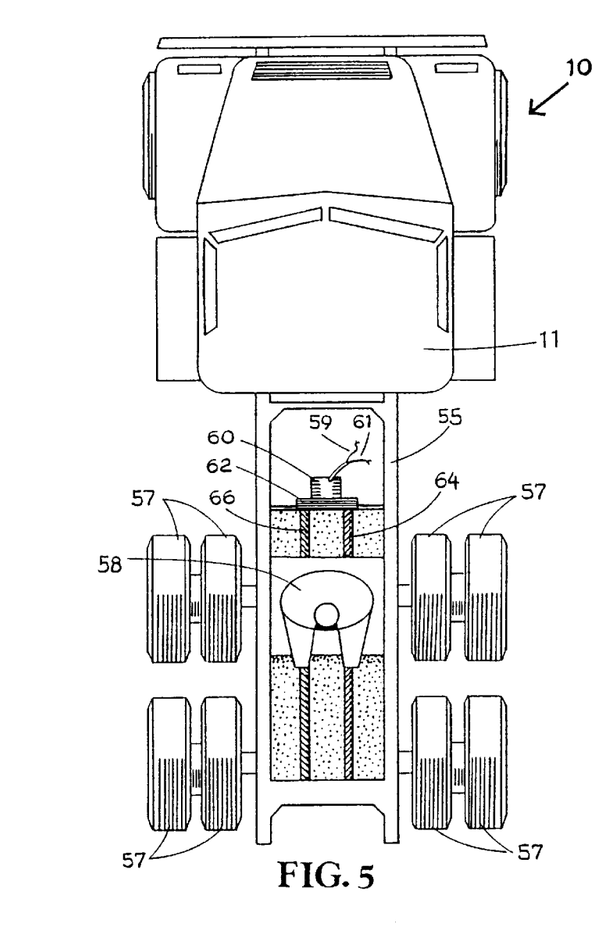
FIG. 5 is a top view of the tractor with sliding fifth wheel shown in FIG. 4. The fifth wheel in this view has been moved forward by actuating the first electric motor.

In FIG. 5, a top view of the tractor 11 with sliding fifth wheel 58 is shown similar to FIG. 4. In this view the fifth wheel 58 has been moved forward by actuating the first electric motor 60 via the leads 59 and 61 to the control module 20. As mentioned above, by using the ball screws attached to the fifth wheel 58 and the screws 64 and 66, the fifth wheel 58 can be moved to a precise location forward and aft and then held in place by the electronic servo of the first electric motor 60 when the truck 10 is in motion. The subject balancing system may also include a solenoid actuated braking device built into the gear box 62 for a back up in preventing movement of the fifth wheel 58.

Figure 6:
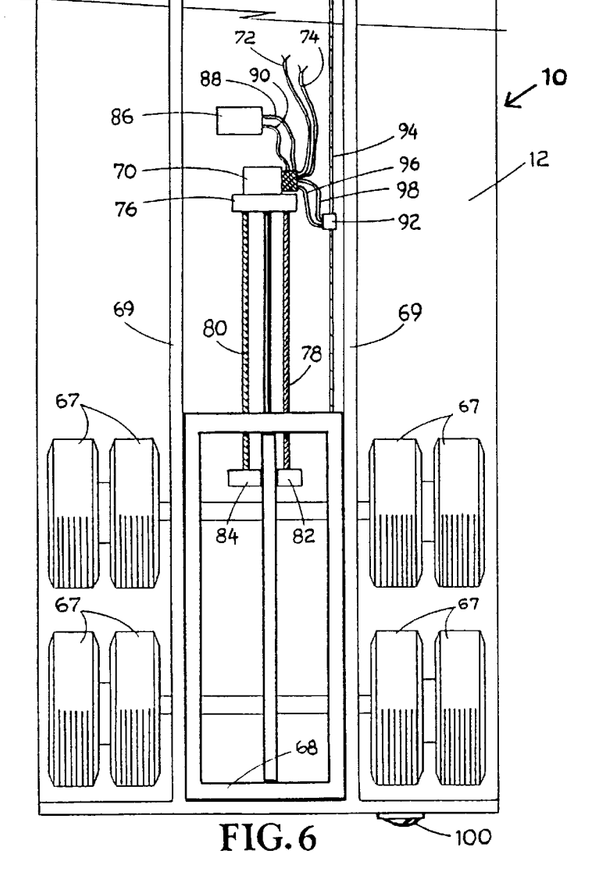
FIG. 6. is a top view of a semitrailer with sliding undercarriage. The sliding undercarriage is moved forward and aft by a by a second electric motor and second gear box driving a pair of parallel screws attached to a pair of ball screws. The ball screws are secured to the sliding undercarriage.

FIG. 6. is a top view of the semitrailer 12 with sliding undercarriage 68 and wheels 67. The sliding undercarriage 68 with wheels 67 slide on a semitrailer frame 69. The sliding undercarriage 68 is moved forward and aft by a second electric motor 70 connected to the control module 20 via electric leads 72 and 74. The second electric motor 70 is secured to the underside of the semitrailer 12. A second gear box 76 is attached to the second electric motor 70 and to one end of a pair of parallel screws 78 and 80. The other end of the screws 78 and 80 are attached to a pair of screw housings 82 and 84. The screws 78 and 80 are received through a pair of ball screws mounted on the sliding undercarriage 68 and are not shown in the drawings. A stabilization rod 86 is disposed between the parallel screws 78 and 80 to provide stability to the ball screw system.

In FIG. 6, the sliding undercarriage 68 is shown in an aft position. A weight sensor 86 is mounted on the underside of the semitrailer 12 and electrically connected to the control module 20 via electric leads 88 and 90. The weight sensor 86 provides the computer with weight and load distribution of the load carried inside the semitrailer 12. Also an air pressure switch 92 is connected to the parking brake air line 94 connected to the air brakes of the wheels 67 of the sliding undercarriage 68. The air pressure switch 92 is connected to the control module 20 via electric leads 96 and 98.

Figure 7:
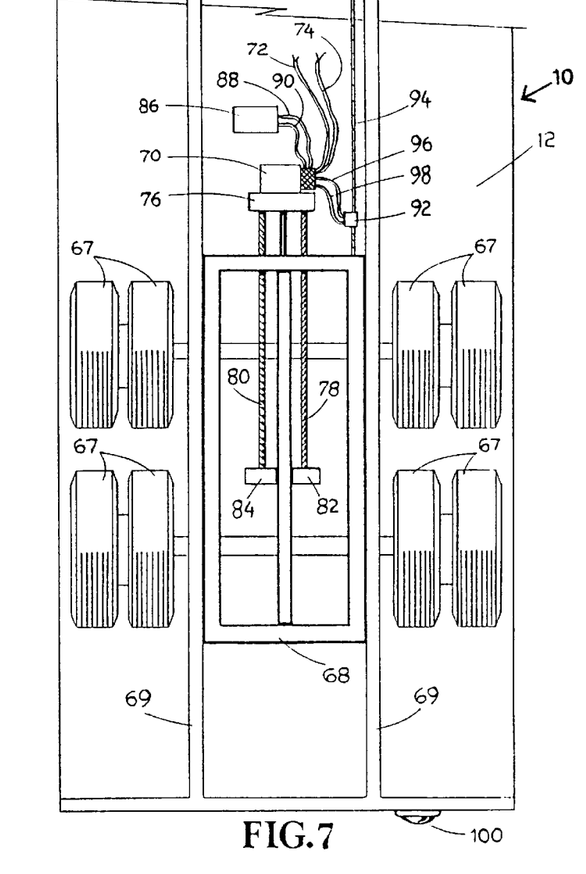
FIG. 7 is a top view of the semitrailer with sliding undercarriage shown in FIG. 6. The sliding undercarriage in this view has been moved forward by actuating the second electric motor.

In FIG. 7, a top view of the semitrailer 12 with sliding undercarriage 68 is shown and similar to the view in FIG. 6. The sliding undercarriage 68 in this drawing has been moved forward by actuating the second electric motor 70 and rotating the parallel screws 78 and 80. The undercarriage 68 can be moved to a precise location forward and aft on the semitrailer 12 and then held in place by an electronic servo built into the second electric motor 70. The electronic servo prevents movement of the semitrailer 12 when the truck 10 is in motion. The subject balancing system may also include a solenoid actuated braking device built into the second gear box 76 for a back up in preventing movement of the undercarriage 68. A flashing indicator light 100 is mounted at the rear of the semitrailer 12 and is used to indicate by flashing when the load on the semitrailer 12 is out of balance. For example, when the truck 10 is driving on city streets and the fifth wheel 58 and sliding undercarriage 68 are moved forward to shorten the turning radius of the truck 10 the load is purposely out of balance and the light 100 will flash. When the truck 10 is back on a highway and load balance button 34 is pushed, the control module 20 with computer will automatically balance the load using the electric motors 60 and 70. the gear boxes 62 and 76 and the parallel screws 64, 66, 78 and 80 with ball screws to move the sliding fifth wheel 58 and the sliding undercarriage 68 into proper alignment. At this time the flashing indicator light 100 will stop flashing.

It is important to point while the invention has been described throughout the application as a load balancing system, the system can be used equally well for adjusting the turning radius of the truck 10 or the operator of the truck can merely use the system for his or her convenience in adjusting the sliding fifth wheel 58 and sliding undercarriage 68 for whatever reason.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. An adjustment system for adjusting a sliding undercarriage along a length of a semitrailer and adjusting a sliding fifth wheel along a length of a tractor, the tractor used for pulling the semitrailer, the semitrailer having an air operated brake, the adjustment system is used for balancing a load on the semitrailer, adjusting the turning radius and for operator convenience, the adjustment system comprising:

a communication and control module with control panel and display;

sliding undercarriage adjustment means connected to said communication and control module for adjusting the sliding undercarriage forward and aft on the semitrailer when said sliding undercarriage adjustment means is actuated by said control module, whereby said sliding undercarriage adjustment means is adapted for mounting on the semitrailer and connected to the air operated brake; and a load balancing switch connected to said control module and connected to an air pressure switch, whereby said air pressure switch adapted for connection to the air operated brake and whereby when said load balancing switch is pushed said sliding undercarriage adjustment means is actuated for adjusting the sliding undercarriage forward and aft when the semitrailer's air operated brake has been disengaged.

2. The system as described in claim 1 wherein said control panel includes a manual control lever connected to said control module, when said manual control lever is operated said sliding undercarriage adjustment means is actual for adjusting the sliding undercarriage forward and aft.

3. The system as described in claim 2 wherein said sliding undercarriage adjustment means is an undercarriage electric motor and gear box mountable on the trailer and electrically connected to said control module, said undercarriage electric motor and gear box attached to and driving a pair of parallel screws threadably attached to a pair of ball screws, said ball screws secured to the sliding undercarriage mounted underneath the semitrailer, whereby when said undercarriage electric motor and gear box are actuated by said control module, said screws move the sliding undercarriage forward and aft on the semitrailer.

4. The system as described in claim 1 wherein said control panel includes a load out of balance indicator light connected to said control module, said control module electrically connected to a load sensor mountable on the semitrailer, said indicator light for displaying when the load is out of balance on the semitrailer.

5. An adjustment system for adjusting a sliding undercarriage along a length of a semitrailer and adjusting a sliding fifth wheel along a length of a tractor, the tractor used for pulling the semitrailer, the semitrailer having an air operated brake, the system is used for balancing a load on the semitrailer, adjusting the turning radius and for operator convenience, the adjustment system comprising:

a communication and control module with control panel and display, said control module under computer control;

sliding fifth wheel adjustment means connected to said control module, whereby said sliding fifth wheel adjustment means adapted for mounting on the tractor and for adjusting the sliding fifth wheel forward and aft on the tractor when said sliding fifth wheel adjustment means is actuated by said control module;

sliding undercarriage adjustment means connected to said control module, whereby said sliding undercarriage adjustment means adapted for mounting on the semitrailer and for adjusting the sliding undercarriage forward and aft on the semitrailer when said sliding undercarriage adjustment means is actuated by said control module; and a load balancing switch connected to said control module, whereby when said load balancing switch is pushed said sliding fifth wheel adjustment means and said sliding undercarriage adjustment means are actuated for adjusting the sliding fifth wheel forward and aft and for adjusting the sliding undercarriage forward and aft for balancing a load on the semitrailer.

6. The system as described in claim 5 wherein said control panel includes a fifth wheel manual control lever connected to said control module, when said fifth wheel manual control lever is operated said sliding fifth wheel adjustment means is actuated for adjusting the sliding fifth wheel forward and aft.

7. The system as described in claim 5 wherein said control panel includes a sliding undercarriage manual control lever connected to said control module, when said sliding undercarriage manual control lever is operated said sliding undercarriage adjustment means is actuated for adjusting the sliding undercarriage forward and aft.

8. The system as described in claim 5 wherein said sliding fifth wheel adjustment means is a fifth wheel electric motor and gear box mountable on the tractor and electrically connected to said control module, said fifth wheel electric motor and gear box attached to and driving a pair of parallel screws threadably attached to a pair of ball screws, said ball screws securable secured to the sliding fifth wheel of the tractor, whereby when said fifth wheel electric motor and gear box are actuated by said control module, said screws move the sliding fifth wheel forward and aft on the tractor.

9. The system as described in claim 5 wherein said sliding undercarriage adjustment means is an undercarriage electric motor and gear box and air pressure switch mountable on the trailer and electrically and pneumatically connected to said control module, said undercarriage electric motor and gear box attached to and driving a pair of parallel screws threadably attached to a pair of ball screws, said ball screws secured to the sliding undercarriage mounted underneath the semitrailer, whereby when said undercarriage electric motor and gear box are actuated by said control module, said screws move the sliding undercarriage forward and aft on the semitrailer.

10. An adjustment system for adjusting a sliding undercarriage along a length of a semitrailer and adjusting a sliding fifth wheel along a length of a tractor, the tractor used for pulling the semitrailer, the semitrailer having an air operated brake, the system is used for balancing a load on the semitrailer, adjusting the turning radius and for operator convenience, the adjustment system comprising:

a communication and control module with control panel and display, said control module under computer control;

sliding fifth wheel adjustment means connected to said control module, whereby said fifth wheel adjustment means adapted for mounting on the tractor and for adjusting the sliding fifth wheel forward and aft on the tractor when said sliding fifth wheel adjustment means is actuated by said control module;

sliding undercarriage adjustment means connected to said control module, whereby said sliding undercarriage adjustment means adapted for mounting on the semitrailer and for adjusting the sliding undercarriage forward and aft on the semitrailer when said sliding undercarriage adjustment means is actuated by said control module; and a computer status display connected to said control module for indicating when the load is not balanced and when the load is balanced on the semitrailer.

11. The system as described in claim 10 wherein said control panel includes a satellite communication push button connected to said control module for receiving tractor and semitrailer information to the computer from a remote satellite when said satellite communication push button is activated.

12. The system as described in claim 10 wherein said control panel includes an audio speaker and audio radio communication button connected to said control module for transmitting information related to the tractor and semitrailer when said audio radio communication button is activated.

13. The system as described in claim 10 wherein said control panel includes a load out of balance indicator light connected to said control module, said control module electrically connected to a load sensor mounted on the semitrailer, said indicator light for displaying when the load is out of balance on the semitrailer.

14. The system as described in claim 10 wherein said control module with control panel and display are mountable in a cab of the tractor.

* * * * *